Sept. 4, 1956 A. W. GAUBATZ 2,761,387
FUEL SYSTEM
Filed Sept. 25, 1950 5 Sheets-Sheet 2

Inventor
Arthur W. Gaubatz
By Willits, Helmig & Baillio
Attorneys

Inventors
Arthur W. Gaubatz
By Willits, Helwig & Baillio
Attorneys

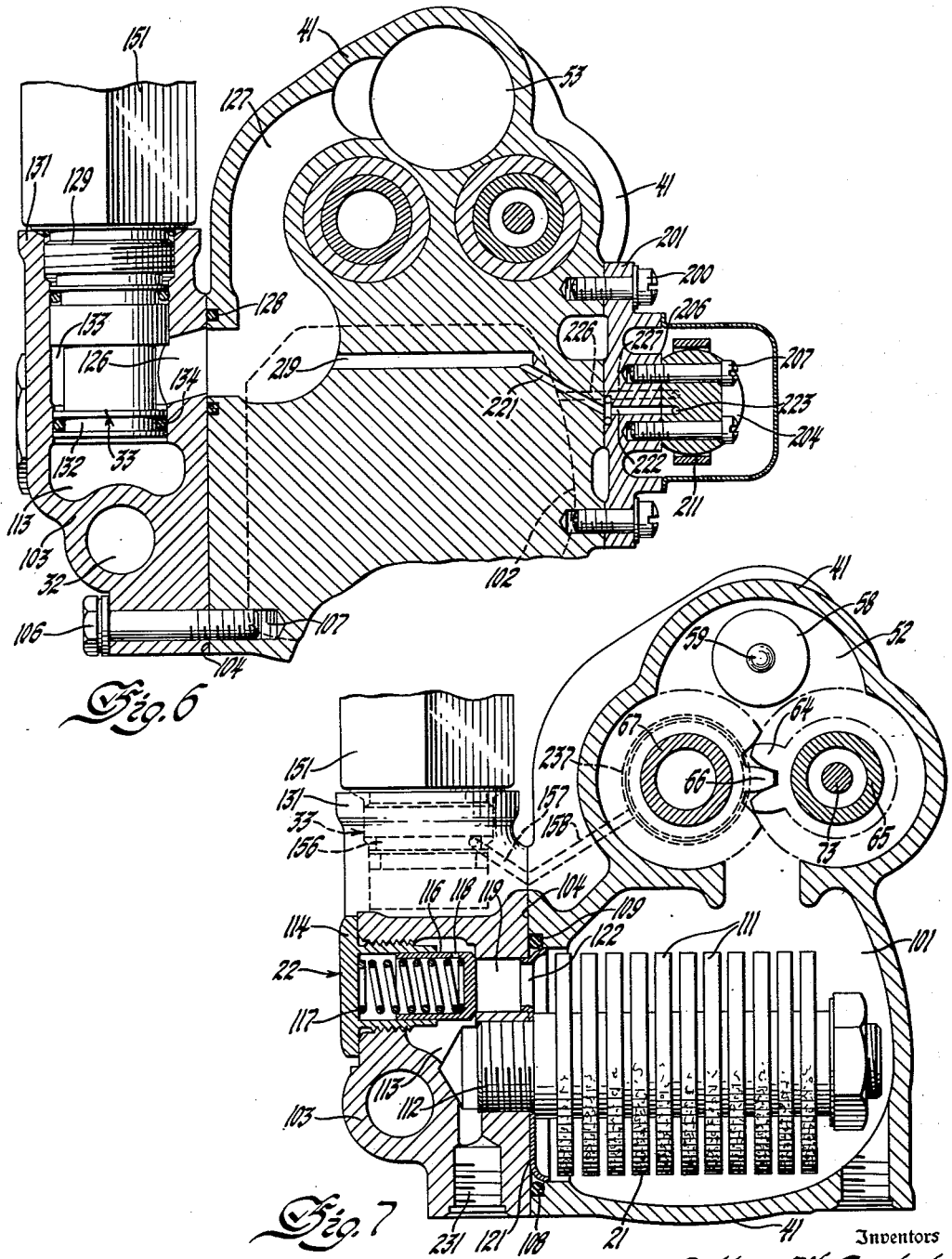

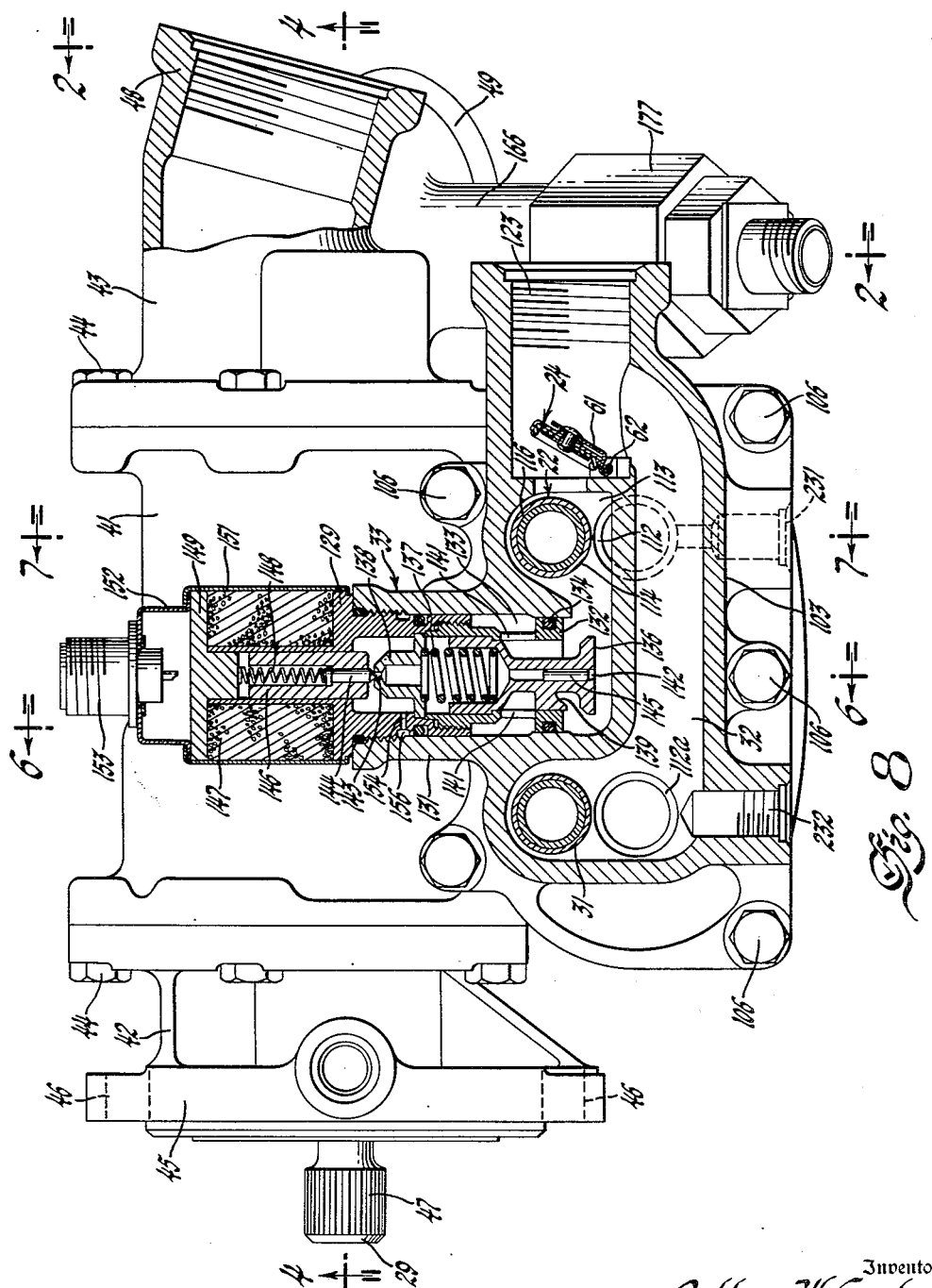

United States Patent Office 2,761,387
Patented Sept. 4, 1956

2,761,387
FUEL SYSTEM

Arthur W. Gaubatz, Indianapolis, Ind., assignor to General Motors Corporation, Detroit, Mich., a corporation of Delaware Application September 25, 1950, Serial No. 186,528

5 Claims. (Cl. 103—10)

This invention relates to fuel systems for engines and, more particularly, to a pump combination and flow control apparatus therefor particularly adapted for supply of fuel to engines of the gas turbine type. In a more specific aspect, the invention is directed to a unitary structure comprising two positive displacement pumps, fuel filters, and valves by means of which the pumps may be employed either in series or in parallel, and by virtue of which either pump may supply the fuel demand in the event of failure of the other pump, as will be made clear in the detailed description of the preferred embodiment of the invention.

The problem of supplying fuel to gas turbine engines for aircraft has received a great deal of attention because of the severe requirements of this service. The utmost reliability is of paramount importance, since failure of the fuel supply will completely disable the engine. In addition, it is desirable to provide increased pump capacity at very low engine speeds to ensure an adequate supply of fuel in starting. Another requirement in aircraft service is adequate provision for inspection, maintenance and repair. In many installations, space and weight limitations increase the difficulty of providing suitable fuel pumping systems.

This invention is directed to the provision of a fuel pumping system in which the entire system is comprised in a compact assembly, easily serviced; in which the fuel demand is normally supplied by one of two pumps which may be termed the main or primary pump; in which the fuel demand may be served by a second pump, which may be termed the auxiliary or secondary pump, in the event of failure of the primary pump; in which both pumps may be utilized in parallel for starting; which includes means for checking the secondary pump; and in which fuel filters are incorporated in the pump housing. The invention involves novel fluid circuits and novel and improved structural arrangements. As will be apparent to those skilled in the art, certain features and advantages of the invention may be employed independently of the others, although, in its preferred form, the system provides all the above-mentioned features and advantages.

Figure 1:
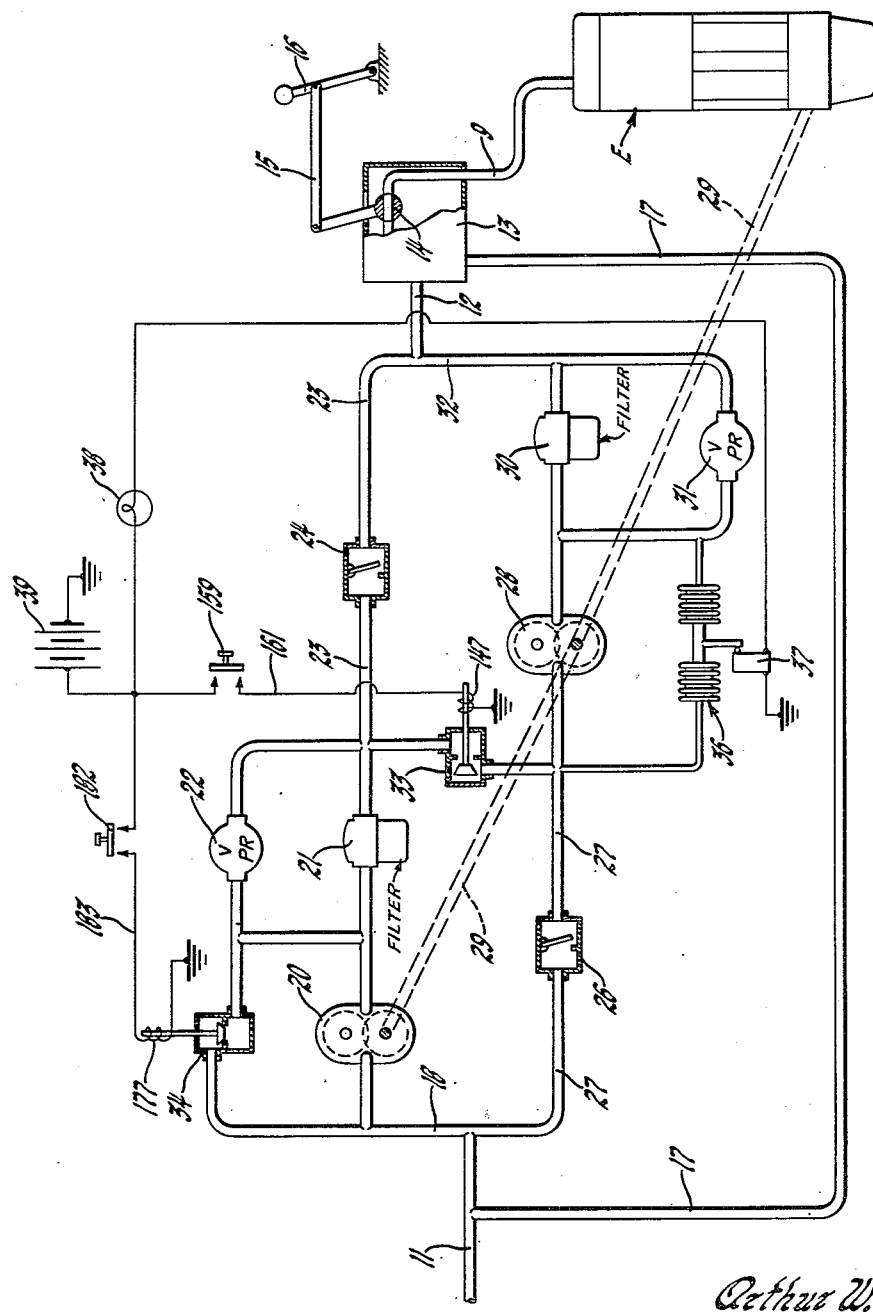
Figure 2:
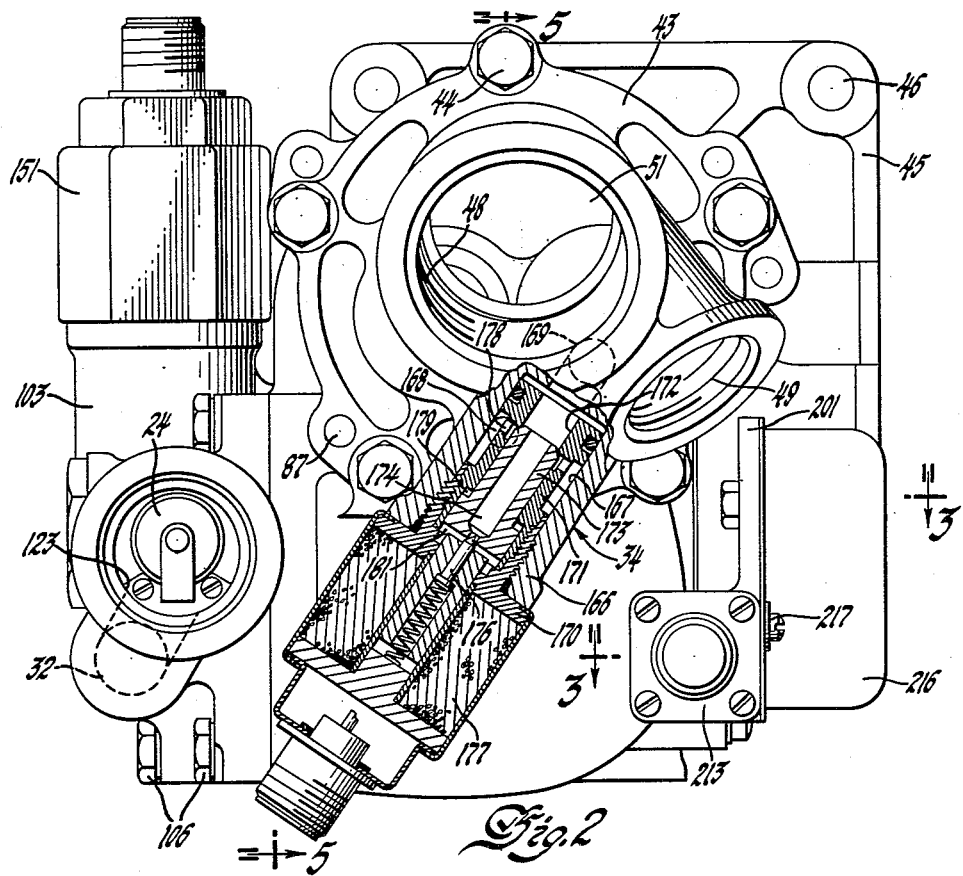
Figure 3:
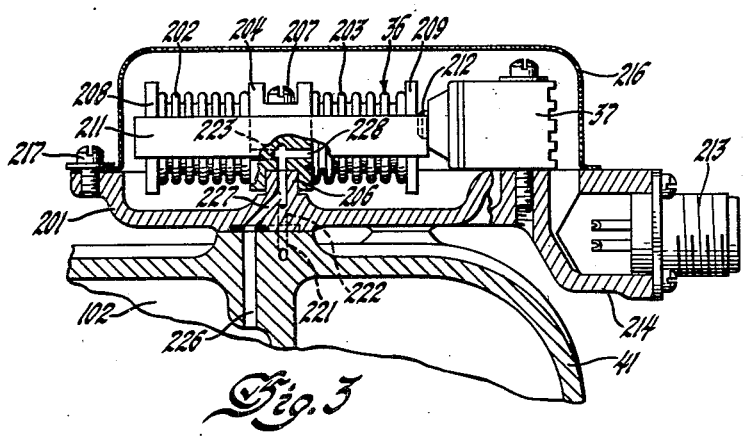
Figure 4:
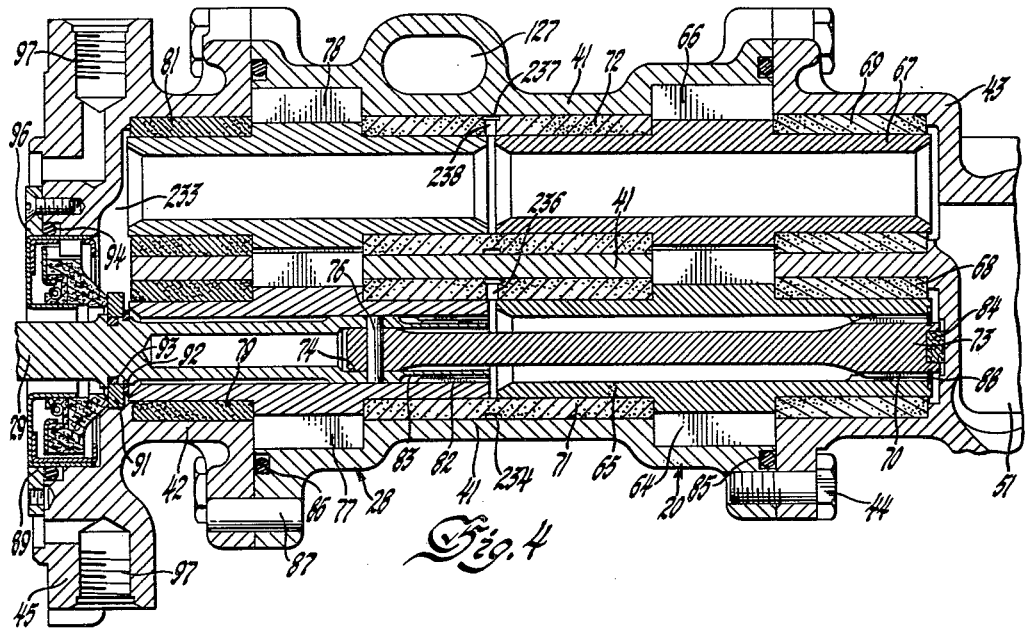
Figure 5:
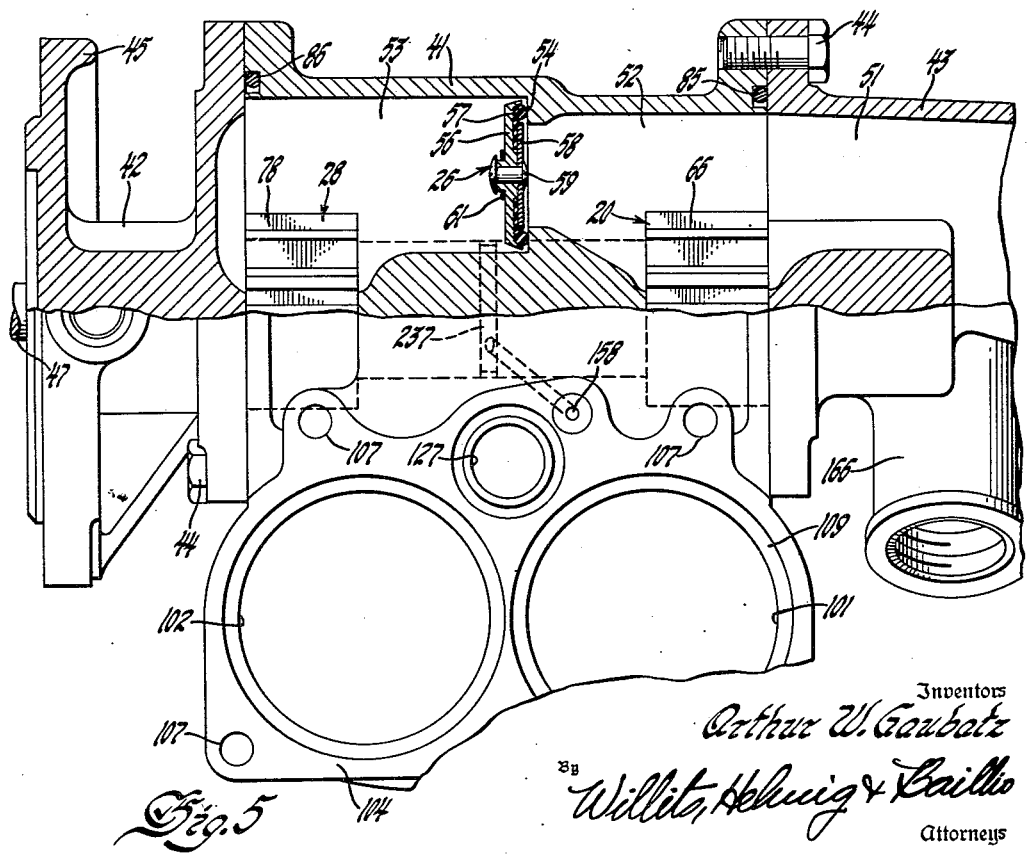

The advantages of the invention, and the preferred manner in which the objects and advantages thereof are realized, will be apparent to those skilled in the art from the appended description of the preferred embodiment of the invention and the accompanying drawings, of which Figure 1 is a diagrammatic illustration of a fuel system incorporating the invention; Figure 2 is an end view partly in section on the plane indicated in Figure 8; Figure 3 is a partial sectional view particularly illustrating the means for signalling primary pump failure, the view being taken on the plane indicated in Figure 2; Figure 4 is a longitudinal sectional view in the plane of the axes of the pump shafts, as indicated in Figure 8; Figure 5 is a longitudinal sectional view at right angles to Figure 4, taken on a plane indicated in Figure 2 with parts removed; Figures 6 and 7 are transverse sectional views taken on the planes indicated in Figure 8; and Figure 8 is a longitudinal view of the preferred embodiment of the fuel system with certain parts in section.

By way of introduction to the detailed description of the structure of the fuel system, the general nature of the fluid circuit and controls will be outlined with particular reference to Figure 1, in which the fuel supply structure of the invention is shown in a diagrammatic manner. Fuel is supplied from the tanks, ordinarily by way of a conventional booster pump (not shown), through a line 11 to the pumping system from which it is discharged under pressure through line 12 to the engine fuel control 13, which may be of known type, including a throttle valve indicated schematically at 14, operated by the pilot's power control lever 16 through a means indicated schematically by the link 15. As is known to those skilled in the art, such fuel control devices incorporate mechanisms to meter the flow of fuel to the engine in accordance with its characteristics, ambient conditions, and the setting of the power control lever. The details of this device are not material to the invention, which is primarily concerned with supplying fuel under pressure to the control device 13. Normally, a supply of fuel greater than is required by the engine, is delivered to the engine control 13. Metered fuel is conducted to the engine E through conduit 9, and the excess is returned to the line 11 through the conduit 17.

Fuel from the lines 11 and 17 is carried by conduit 18 to a primary gear pump 20, by which it is delivered through a filter 21, which is paralleled by relief by-pass valve 22, to a conduit 23, which communicates with the discharge line 12 through a check valve 24 in conduit 23. The supply line 11 is also connected through a conduit 27, in which is a check valve 26 which permits flow only from the supply line, to the inlet of the secondary pump 28. The pumps 20 and 28 are driven by a common shaft 29, driven by the engine. The outlet of the secondary pump 28 communicates through a filter 30, with parallel by-pass valve 31, and a conduit 32 with the fuel discharge line 12. The discharge from the primary pump 20 and filter 21 is conducted through a normally open solenoid-actuated valve 33 to the inlet of the secondary pump 28 so that, in normal operation, the pumps are in series, and fuel thus passes from the inlet 11 through line 18, pump 20, filter 21, valve 33, pump 28, filter 30, and lines 32 and 12 to the fuel control 13. In order to ensure that the pump 20 normally assumes the load, the displacement of this pump is approximately 10% greater than that of the secondary pump 28. As a result, the secondary pump runs idle and approximately 10% of the output of the primary pump by-passes the secondary pump by way of conduit 23 and check valve 24. Since the service requirements are exacting, the loaded primary pump will wear more rapidly than the secondary pump and its volumetric efficiency will decrease. If the slip of the primary pump becomes sufficiently great that its displacement becomes less than that of the secondary pump, the secondary pump will develop a positive pressure, close the check valve 24, and take over part of the load.

The secondary pump 28 may also draw fluid from the inlet 11 through check valve 26 in the case when the primary pump delivery does not equal the intake demands of the secondary pump.

For starting the engine, when the fuel requirements are high relative to the speed of the pump drive shaft 29, the pumps may be connected in parallel for increased delivery by closing the valve 33. In this case, the primary pump delivers fuel from the lines 11 and 18 through filter 21 and check valve 24 to the outlet 12, and the secondary pump 28 draws fuel through the check valve 26 in conduit 27 and discharges through filter 30 and conduit 32 to the outlet.

The system includes a solenoid-operated checkout valve 34, which is normally closed, but may be opened to interconnect the inlet and outlet of the primary pump. The primary pump is thus put out of service, and the secondary pump 28 takes over the load. It is thus possible to determine, before taking off, whether the secondary pump is capable of delivering fuel of the required volume and pressure.

The system also includes means for warning the pilot or flight engineer, during operation of the aircraft, of failure of the primary pump. Since the secondary pump runs idle until the full-pressure displacement of the primary pump becomes less than the no-load displacement of the secondary pump, primary pump failure, and also reduced volumetric efficiency indicative of incipient failure, are indicated by the development of positive pressure across the secondary pump. The differential pressure sensitive device 36 operates to close a switch 37 when positive pressure is developed by the secondary pump. The switch is connected to a warning light 38 energized from a battery or other source 39 to indicate this condition to flight personnel.

Referring now to the preferred physical structure of the apparatus, the device comprises (Figure 8) a body or housing 41 formed with flanges at each end, to which are secured a drive end cover 42 and an inlet end cover 43, which may be secured by cap screws 44. The end cover 42 is machined for mounting on a mounting pad of the engine, and includes a flange 45 formed with holes 46 for mounting studs (not shown). The pump driving shaft 29 extends through the cover 42, and is formed with an enlarged splined end 47 which couples with an accessory drive shaft of the engine (not shown) in a customary manner.

The inlet end cover 43 includes a tapped inlet connection boss 48 for the fuel supply line 11 and a second tapped boss 49 for the return line 17. The inlets 48 and 49 lead into a passage or chamber 51 (Figs. 2, 4 and 5) which communicates with primary pump inlet chamber 52 in the body 41. The inlet chamber 53 for the secondary pump is aligned with the chamber 52 and terminates in a shoulder 54 against which is seated the check valve 26. The valve 26 may be a commercial valve of the clack type, comprising a disk 56, a resilient seating member 57, and a retainer 58, united by a rivet 59. The valve disk is supported by a pivoted member 61, the pivot for which is not shown in Figure 5. The valve 26 is, however, of the same type as valve 24 illustrated in Figures 8 and 2, in which the corresponding member 61 is illustrated as hinged on a pin 62 extending transversely of the passage. The arms 61 are somewhat loosely attached to the disks 56.

Considering now the structure of the pumps 20 and 28, it may be pointed out that these are gear pumps provided with a common drive which, however, is so constituted that if either pump jams, the driving connection to that pump will be broken, leaving the other pump in operation. Referring to Figure 4, the primary pump 20 includes a driving gear 64, integral with the hollow shaft 65 extending axially from the gear in both directions, and a driven gear 66 integral with hollow shaft 67. The shafts rotate in graphite bushings 68 and 69, of a type known commercially as "Graphitar" bushings, fitted in recesses in the end cover 43, one face of the gears rotating against the ends of the bushings and the inner face of the end cover 43. The other ends of the shafts 65 and 67 rotate in graphite bushings 71 and 72 in the body 41, the body being bored to receive the bushings and counterbored to provide chambers for the gears 64 and 66. The hollow shaft 65 is formed with internal splines which are engaged by external splines 70 on a driving shaft 73, the central portion of which is of a reduced diameter and the driven end of which is pressed into a counterbore 74 in the shaft 29. A pin 76 couples the shafts 29 and 73.

The secondary pump 28 is of similar structure to the pump 20, and is mounted in the opposite end of body 41, with the outboard end of the gear shafts supported in the drive end cover 42. The secondary pump comprises an integral driving gear and hollow shaft 77 meshing with a driven gear 78 integral with a hollow shaft. The inner ends of these shafts are supported in the bushings 71 and 72 respectively, and the outer ends in graphite bushings 79 and 81 in the end cover 42. The inboard end of the shaft 29 is formed with splines 82 engaging companion splines on the shaft of gear 77. The portion 83 of the shaft 29 adjacent the splines 82 is of reduced section so that, if the secondary pump 28 jams, the shaft will shear at this point, permitting continued drive of the primary pump 20. If, on the other hand, the primary pump 20 jams, the reduced central portion of the shaft 73 will shear, so that the secondary pump 28 is not disabled.

A graphite thrust button 84 is fitted in the end of shaft 73 and bears against the end cover to take the thrust of the shaft seal at the shaft end of the pump. O-rings 85 and 86 are fitted in recesses in the faces of the body 41 to prevent leakage. Locating pins, such as 87 (Fig. 4), may be provided to ensure correct alignment of the end covers. The shaft 65 is retained on the shaft 73 by a snap ring 88 when the end covers are removed. A rotary shaft seal 89, which may be of any suitable commercial type, is fitted in a recess in the drive end cover 42 to prevent escape of fluid along the rotating shaft 29. This seal engages a ring 91 seated on the shaft 29 between a shoulder on the shaft and a snap ring 92. An O-ring 93 seated in a groove in the shaft seals against escape of fluid through the inner surface of the ring 91. An O-ring 94 mounted in a counterbore of the end cover and retained by a ring plate 96 prevents escape of fuel along the outer surface of the seal 89. Drain passages 97 are provided for fuel escaping from the pump or oil escaping from the driving mechanism on which the pump is mounted.

As previously stated, the primary and secondary pumps receive fluid from the chambers 52 and 53 respectively (Figure 5). The discharge arrangements for these pumps may be best understood with reference to Figure 7, which is a transverse sectional view through the primary pump, and also by reference to Figure 5. The primary and secondary pumps discharge into chambers 101 and 102 respectively, which are disposed side by side within the casing 41. These chambers contain the filters 21 and 30 (Fig. 1) respectively. The filters are mounted on a valve housing 103 (Figures 8, 2, 6, and 7) so as to extend into the chambers 101 and 102. The valve housing 103 is secured to a plane face 104 of the pump housing by cap screws 106 threaded into tapped holes 107 in the body 41. The valve housing 103 serves as a closure for the filter chambers, leakage being prevented by O-rings 108 mounted in counterbores 109 in the filter chambers.

The filter 21 (Fig. 7) is of a known type, fluid entering through the filter elements 111 and being discharged from the filter through a hollow threaded post 112, by which the filter is supported on the valve housing 103, into a primary pump filter outlet chamber 113. A filter by-pass to eliminate the possibility of failure of the fuel supply because of a clogged filter is provided by the simple relief valve 22, which comprises a body 114 threaded into the valve housing, a sliding plunger 116 guided in the body, and a compression spring 117. The sliding plunger 116 is formed with a vent outlet 118 and normally seats against the discharge opening of a passage 119 through the valve housing interconnecting the pump discharge chamber 101 and the chamber 113. The relief valve 22 is set to open at a pressure indicative of a clogged condition of the filter 21 and thus by-pass the filter. A plate 121 which seats against the valve housing and the walls of the chamber 101 is formed with a discharge opening 122 registering with the passage 119. This plate serves as a retainer for the O-ring 108.

The secondary pump 28 is provided with a filter 30 mounted in the chamber 102 (Fig. 5) and provided with a by-pass valve 31 similar to the primary pump filter by-pass. The outlet 112a of the secondary pump filter and the by-pass valve 31 are indicated in Figure 8 discharging into a passage 32 communicating directly with the outlet 123 in the valve housing which is tapped to receive a suitable pipe fitting or conduit. The chamber 113 into which the primary pump discharges communicates with the outlet 123 through the non-return check valve 24, which need not be described in detail, since it is similar in structure to the valve 26.

The valve housing 103 provides a mounting for the normally open valve 33 which is inserted in the line between the discharge of the primary pump and the inlet of the secondary pump. As shown most completely in Figure 6, the valve 33 is inserted between the primary pump outlet chamber 113 and a passage 126 leading to the mounting face of the valve housing and discharging into a passage 127 in the pump housing which leads to the intake chamber 53 of the secondary pump. The conduit is sealed by an O-ring 128 in an annular recess around the entrance opening of the passage 127. Thus, with valve 33 open, the discharge from the primary pump is fed to the secondary pump, any excess over the capacity of the secondary pump passing through the check valve 24 to the outlet.

The valve 33 is of a type normally held open by a spring and closed by hydraulic pressure under the control of a solenoid-actuated pilot valve. The body of the valve 33 comprises an annular part 129 (Fig. 8) threaded into a boss 131 of the valve housing. An extension 132 of the body, threaded into the part 129, is seated in the passage 133 extending through the portion 131 of the valve housing and is sealed by an O-ring 134. A valve plunger 136 slides within the body 132 and is urged downwardly by compression spring 137 and limited in its downward movement by shoulders on the plunger and its housing. The spring 137 is retained by a pilot valve seat member 138 clamped between the two parts of the valve body. The valve member 136 is guided by an interrupted flange 139 on the valve portion 132, and, when moved upwardly, the head of the valve member seats against the lower end of the body to close the outlet from the chamber 113. The valve portion 132 is provided with lateral passages 141 by which fluid is discharged into the chamber 133 and through the passages 126 and 127. A passage 142 through the stem of the valve member 136 normally equalizes the pressure in the upper and lower ends of the valve plunger so that the valve is held open by the spring 137. A sliding plunger 145 in the passage 142 defines a restricted annular orifice through the passage which is cleaned by reciprocation of the plunger. The plunger 145 is retained by peening the ends of the passage 142. To close the valve, the pressure above the plunger is bled off through a pilot valve port 143 in the pilot valve member 138 which is normally closed by a valve member 144 mounted in the plunger 146 of a solenoid 147. The plunger is normally biased downwardly to close the pilot valve by spring 148. When the solenoid 147 is energized, the plunger 144 is raised by coaction of the plunger 146 and a shoulder on the valve member 144. Fluid under pressure from the chamber 113 thus proceeds through the two throttling passages 142 and 143 in series and the pressure above the main valve plunger becomes less than that below, so that the valve is closed. The electromagnetic pilot valve also includes an armature 149, an outer shell composed of a jacket 151 and an upper end cover 152, and a fitting 153 for an electrical conduit which energizes the solenoid. Fuel bled through the pilot valve 138, 144 is discharged through radial passages 154 and an annular groove 156 in the valve body to passages 157 in the valve housing (Fig. 7) and 158 in the pump body (Figs. 5 and 7) to a groove 237 in the shaft bushing 72 (Fig. 4) which is vented to the pump inlet, as will be explained. Solenoid 147 is energized from the source 39 by a normally open switch 159 through a line 161. Switch 159 may be operated manually, or by a starting control system, if desired.

The primary pump 20 may be by-passed by the normally closed valve 34 (Fig. 2) which is mounted in a threaded boss 166 of the inlet end cover 43 and, when energized, opens a passage between the outlet chamber 101 and the inlet chamber 51 of the primary pump. The boss 166 is formed with a central passage 167 which communicates with the primary pump outlet chamber 101 through a drilled passage 168 in the end cover. The inner end of the passage 167 communicates through a passage 169 with the chamber 51. The valve 34 is structurally similar in some respects to the valve 33. The body portion 170 threads into the boss 166 and mounts a body extension 171 extending into the chamber 167, the lower end of the portion 171 being formed with a discharge passage 172, the inner end of which provides a seat for the valve plunger 173 which slides freely in the body portion 171. The plunger 173 is provided with a central passage 174 which may be closed by a spring-urged pilot valve plunger 176 actuated by a solenoid 177 of the same structure as that previously described. Fluid may flow from the inlet 168 of the valve through radial passages 178 adjacent the valve seat and, when the plunger 173 is unseated, through the outlet 172 of the valve.

Fluid under pressure from the primary pump outlet also seeps along the outer surface of plunger 173 into an annular chamber 179 between shoulders on the plunger 173 and the body member 171. From chamber 179 it seeps past the head of the plunger into chamber 181 above the head of the valve. Normally, the outlet from chamber 181 through passage 174 to the low inlet pressure is closed by the solenoid-actuated plunger 176. Since the effective area of chamber 181 is greater than that of chamber 179, hydrostatic forces hold the valve member 173 against its seat. When solenoid 177 is energized, chamber 181 is vented and fluid pressure in chamber 179 opens the valve.

Solenoid 177 is energized from the source 39 through a manually operable normally open pilot's checkout switch 182 and a line 183.

The differential pressure responsive mechanism 36 and switch 37 actuated thereby (Fig. 1), with the fluid connections thereto, are illustrated in Figures 2, 3, and 6. As previously stated, this device is responsive to differential pressure across the secondary pump 28 which, in the normal condition of the system with the primary pump in proper condition, is substantially zero. When the primary pump begins to fail and the secondary pump takes over a significant part of the load, the increase in pressure across the secondary pump is detected and signalled to the pilot by the elements 36, 37, and 38. As shown most clearly in Figures 3 and 6, the differential pressure device is mounted on a base plate 201 fixed to the pump casing by cap screws 200. The pressure sensitive element comprises two expansible bellows 202 and 203 sealed to a central block 204. The block 204 is mounted on a projection 206 of the plate 201 by cap screws 207, and plates 208 and 209 at the outer ends of the bellows are joined by rigid straps 211 on each side of the assembly so that the outer ends of the bellows are constrained to move together. One end plate 209 may engage the operating plunger 212 of the pressure-sensitive switch 37 which is connected to a plug receptacle 213 mounted on an extension 214 of the base plate 201. The pressure-sensitive switch assembly is protected by a cover 216 mounted by screws 217. Secondary pump inlet pressure is conducted (Figure 6) from the passage 127 through drilled passages 219 and 221 in the pump casing, 222 in the plate 201, and 223 in the block 204 to the bellows 202. Pressure is conducted from the outlet chamber 102 of the secondary pump through drilled passages 226 in the pump body, 227 in the plate 201, and 228 in the block 204 to the bellows 203. When the pressures in the two bellows are equal, they will be in a neutral position determined by their elastic properties. When the pressure in the pump outlet exceeds that in the inlet, the bellows 203 will expand and contract the bellows 202, the plate 209 engaging the switch actuator 212 to close the circuit to warning light 38.

Drains 231 and 232 (Figures 8 and 7) are provided for the pump outlet passages. These drains may normally be plugged.

Fluid escaping along the pump shafts or shaft bushings is discharged into the pump inlet. Fluid escaping along the outer end of the shaft 65 (Figure 5) or its bushing 68 may escape directly into the inlet chamber 51 through an extension of chamber 51 not shown in the drawings. Fluid passing along the outer surface of bushing 71 from gears 64 and 77 is received in a groove 234 in the outer surface of the bushing. A radial passage 236 in the bushing drains between the ends of the shafts of gears 64 and 77 to the interior of the hollow shaft of gear 64. Fluid escaping along shaft 65 or the inner end of the shaft of gear 77 likewise passes between the ends of the shafts. This leakage escapes through the shaft of gear 64 between the splines 70 to the chamber at the intake end of the pump.

Shaft 29 may fit loosely enough in the shaft of gear 77 to permit flow from within the shaft out the open end to chamber 233, if desired. The drive shaft end of gear 78 and its bushing 81 likewise drain into the chamber 233, which is in communication with the pump inlet chamber 51 through the hollow shafts of gears 78 and 66. The driven gear shaft bushing 72 is formed with a central peripheral groove 237 bled into the passage through the hollow shafts by a radial passage 238. Thus, no significant unbalanced pressure may be developed against the end surfaces of the gear or their shafts to create undue frictional resistance to rotation.

The operation of the system will, it is believed, be clear to those skilled in the art from the foregoing, but may be described briefly. When the engine is being started, the switch 159 is closed to energize the solenoid 147 and close the normally open paralleling valve 33. As the engine is turned over by the starter, both pumps are driven and discharge in parallel through line 12 to the fuel control. In the initial phases of starting, the throttle 14 is closed and the fuel is by-passed to the pump inlets through the line 17. When the power unit has reached a suitable speed for starting, the throttle 14 is opened to supply fuel to the engine. The fuel is ignited and the engine brought to running speed in the customary manner. After the start has been accomplished switch 159 is opened, restoring the pumps to their normal series relation. The pump 20 then supplies the engine, approximately 90% of the output of this pump passing through pump 28 which is running idle, and the remainder passing through the check valve 24.

Before taking off, the pilot temporarily closes switch 182 to energize the solenoid 177 and open the primary pump by-pass valve 34. With the primary pump thus disabled, the engine is supplied by the secondary pump 28 through the check valve 26. Obviously, if the secondary pump is incapable of handling the fuel demand, this fact will be apparent from the operation of the engine, and corrective measures may be taken.

If the primary pump is not supplying the full engine demand at any time, pressure will be developed across the secondary pump, which fact will be sensed by the pressure-sensitive switch assembly 36, 37, and indicated by the light 38.

In continued operation, the pump 20 normally supplies the load with any excess over the engine requirements returning through the line 17. If, at any time, the primary pump is inadequate, the secondary pump takes over to whatever extent is necessary up to the capacity of the secondary pump, which is sufficient to maintain normal engine operation.

Normally, all of the fuel is pumped through the filter 21 and approximately 90% through the additional filter 30. When the pumps are in parallel, the discharge from each pump goes through one filter and when the emergency pump takes over its discharge goes through filter 30. Thus, except in parallel operation, or when the primary pump becomes disabled, nearly all the fuel is twice filtered.

The filter by-pass valves 22 and 31 are normally closed but may open to prevent starving the engine if the filters become clogged with dirt.

It will be apparent to those skilled in the art from the foregoing description that the invention most adequately accomplishes the stated objects. In this connection, it may be pointed out that the patent drawings are full-scale drawings of a mechanism capable of supplying fuel demands of a gas turbine engine of approximately 3000 horsepower.

The compactness of the assembly and its ready accessibility for servicing, cleaning filters, or general repair or replacement of parts, are obvious. The saving in installation complexity and weight, and the advantages in reliability are indicated by the fact that all the fluid circuits shown in Figure 8 are contained within the compact assembly of Figures 2 to 8, except the fuel lines 9, 11, 12 and 17, and the fuel control 13.

Special starting fuel controls, in addition to the main fuel control, indicated as 13, may be provided if desired in accordance with engine characteristics. Such circuits are not essential to the utilization of the invention or necessary to the understanding thereof, and therefore need not be described.

It will be apparent to those skilled in the art that many modifications of the invention may be made within the scope thereof, which is not to be construed as limited or restricted by the detailed description of the presently preferred embodiment of the invention.

I claim:

1. A fuel pumping system comprising, in combination, a fluid inlet line; a fluid outlet line; first and second pumps connected between the lines, the first pump normally providing the full pressure rise from inlet line to outlet line and the full discharge of the first pump flowing to the outlet line, the second pump normally running unloaded, the pumps being of a constant-volume positive-displacement type and being connected in series; means for driving the pumps at a fixed displacement ratio with the displacement of the first pump greater than that of the second in normal operation; means including the first pump responsive to normal operation of the first pump to unload the second pump; means including the second pump responsive to reduction in output of the first pump to load the second pump and unload the first pump; and means operable independently of fluid pressure conditions in the system to parallel the pumps.

2. A fluid pumping system comprising, in combination, a fluid inlet line; a fluid outlet line; a main pump normally delivering fluid from the inlet line to the outlet line and providing the full pressure rise from the inlet line to the outlet line; an auxiliary pump normally running unloaded with no significant pressure rise therein; the main pump being of larger displacement than the auxiliary pump, each pump being connected in a circuit from the inlet line to the outlet line; a check valve in each said circuit, one check valve being upstream of the pump in its circuit, and the other check valve being downstream from the pump in its circuit; a normally open fluid cross connection between the two circuits entering each circuit between the pump and the check valve, whereby the flow through the main pump normally satisfies the displacement of the auxiliary pump and thereby unloads the auxiliary pump; the auxiliary pump assuming the load upon decrease in displacement of the main pump to a value less than the displacement of the auxiliary pump; a normally open stop valve in the said cross connection closable to effect parallel operation of the pumps, and means external to the fluid system operable at will and independently of fluid pressure conditions in the system to close the stop valve.

3. A fuel pumping system comprising, in combination, a fluid inlet line; a fluid outlet line; first and second pumps connected between the lines, the first pump normally providing the full pressure rise from inlet line to outlet line and the full discharge of the first pump flowing to the outlet line, the second pump normally running unloaded, the pumps being of a constant-volume positive-displacement type and being connected in a series circuit; a first filter downstream from one pump and upstream from the other pump in the series circuit, and a second filter downstream from the said other pump in the series circuit; means for driving the pumps at a fixed displacement ratio with the displacement of the first pump greater than that of the second in normal operation; means including the first pump responsive to normal operation of the first pump to unload the second pump; means including the second pump responsive to reduction in output of the first pump to load the second pump and unload the first pump; and means operable independently of fluid pressure conditions in the system to parallel the pumps.

4. A fluid pumping system comprising, in combination, a fluid inlet line; a fluid outlet line; a main pump normally delivering fluid from the inlet line to the outlet line and providing the full pressure rise from the inlet line to the outlet line; an auxiliary pump normally running unloaded with no significant pressure rise therein; the main pump being of larger displacement than the auxiliary pump, each pump being connected in a circuit from the inlet line to the outlet line; a check valve in each said circuit, one check valve being upstream of the pump in its circuit, and the other check valve being downstream from the pump in its circuit; a normally open fluid cross connection between the two circuits entering each circuit between the pump and the check valve, whereby the flow through the main pump normally satisfies the displacement of the auxiliary pump and thereby unloads the auxiliary pump; the auxiliary pump assuming the load upon decrease in displacement of the main pump to a value less than the displacement of the auxiliary pump; two filters, each filter being connected in the outlet of one of the pumps, the filter in the outlet of the pump upstream from the cross connection being also upstream from the cross connection; a normally open stop valve in the said cross connection closable to effect parallel operation of the pumps, and means external to the fluid system operable at will and independently of fluid pressure conditions in the system to close the stop valve.

5. A fluid pumping system comprising, in combination, a fluid inlet line; a fluid outlet line; a main pump normally delivering fluid from the inlet line to the outlet line and providing the full pressure rise from the inlet line to the outlet line; an auxiliary pump normally running unloaded with no significant pressure rise therein; the main pump being of larger displacement than the auxiliary pump, each pump being connected in a circuit from the inlet line to the outlet line; a check valve in each said circuit, one check valve being upstream of the pump in its circuit, and the other check valve being downstream from the pump in its circuit; a normally open fluid cross connection between the two circuits entering each circuit between the pump and the check valve, whereby the flow through the main pump normally satisfies the displacement of the auxiliary pump and thereby unloads the auxiliary pump; the auxiliary pump assuming the load upon decrease in displacement of the main pump to a value less than the displacement of the auxiliary pump; a normally open stop valve in the said cross connection closable to effect parallel operation of the pumps, and means external to the fluid system operable independently of fluid pressure conditions in the system to close the stop valve.

References Cited in the file of this patent

UNITED STATES PATENTS

| | | |
|---|---|---|
| 1,658,307 | Small | Feb. 7, 1928 |
| 1,970,380 | Hosel | Aug. 14, 1934 |
| 2,001,858 | Watson | May 21, 1935 |
| 2,051,282 | Yerges | Aug. 18, 1936 |
| 2,218,565 | Vickers | Oct. 22, 1940 |
| 2,344,565 | Scott et al. | Mar. 21, 1944 |
| 2,366,388 | Crosby | Jan. 2, 1945 |
| 2,370,506 | Tabb | Feb. 27, 1945 |
| 2,440,371 | Holley | Apr. 27, 1948 |
| 2,532,856 | Ray | Dec. 5, 1950 |
| 2,640,423 | Boyer | June 2, 1953 |
| 2,665,637 | Lauck | Jan. 12, 1954 |
| 2,665,638 | Lauck | Jan. 12, 1954 |